(12) United States Patent
Zinter

(10) Patent No.: US 11,920,711 B2
(45) Date of Patent: Mar. 5, 2024

(54) HOSE CLAMP WITH PAWL AND RELATED METHODS

(71) Applicant: Barney Zinter, Milton-Freewater, OR (US)

(72) Inventor: Barney Zinter, Milton-Freewater, OR (US)

( * ) Notice: Subject to any disclaimer, the term of this patent is extended or adjusted under 35 U.S.C. 154(b) by 223 days.

(21) Appl. No.: 17/531,655

(22) Filed: Nov. 19, 2021

(65) Prior Publication Data

US 2023/0127450 A1  Apr. 27, 2023

Related U.S. Application Data

(63) Continuation-in-part of application No. 17/511,392, filed on Oct. 26, 2021, now Pat. No. 11,598,459.

(51) Int. Cl.
| | |
|---|---|
| *F16L 33/08* | (2006.01) |
| *F16L 33/03* | (2006.01) |
| *F16L 33/035* | (2006.01) |

(52) U.S. Cl.
CPC ............. *F16L 33/08* (2013.01); *F16L 33/035* (2013.01)

(58) Field of Classification Search
CPC .......... F16L 33/08; F16L 33/035; F16L 23/04
See application file for complete search history.

(56) References Cited

U.S. PATENT DOCUMENTS

| | | | | |
|---|---|---|---|---|
| 1,473,715 A | * | 11/1923 | Wessel | F16L 33/04 |
| | | | | 24/279 |
| 1,745,279 A | * | 1/1930 | Skinner | F16L 55/17 |
| | | | | 24/269 |
| 2,522,494 A | * | 9/1950 | Baldo | F16L 33/08 |
| | | | | 24/274 R |
| 3,371,392 A | * | 3/1968 | Rueckheim | F16L 33/08 |
| | | | | 24/274 R |
| 4,546,524 A | * | 10/1985 | Kreft | F16L 33/02 |
| | | | | 24/274 WB |
| 7,055,225 B1 | * | 6/2006 | Brant, Jr. | F16L 33/02 |
| | | | | 285/420 |
| 2002/0038495 A1 | * | 4/2002 | Anthes | F16L 33/04 |
| | | | | 24/279 |
| 2006/0170215 A1 | * | 8/2006 | Cousineau | F01N 13/1805 |
| | | | | 285/420 |
| 2008/0289153 A1 | * | 11/2008 | Bowater | F16L 33/08 |
| | | | | 29/244 |
| 2010/0281655 A1 | * | 11/2010 | De Campos | F16L 33/08 |
| | | | | 24/19 |

(Continued)

*Primary Examiner* — David M Upchurch
(74) *Attorney, Agent, or Firm* — Sierra IP Law, PC; Mark D. Miller

(57) ABSTRACT

Disclosed are methods and apparatus that allow hand forces to easily cinch up and tighten a slotted band of a hose clamp to a position where a worm gear screw may then be used to firmly tightening the hose clamp around a hose or pipe. A cinching operation may be accomplished using a pawl apparatus provided at one end of a hose clamp having a centrally located downwardly facing tooth provided between a pair of oppositely positioned side walls which act as guides for receiving a slotted band of a hose clamp. A tightening operation may then be accomplished by turning the screw of a worm gear at the other end of the hose clamp. The hose clamp may be removed by releasing the pawl assembly or unscrewing the worm and gear screw.

4 Claims, 7 Drawing Sheets

(56) References Cited

U.S. PATENT DOCUMENTS

2015/0068016 A1* 3/2015 Harris .................... F16B 39/20
  24/280
2022/0299054 A1* 9/2022 Gallegos de la Peña ..................
  F16B 5/08

* cited by examiner

HOSE CLAMP WITH PAWL AND RELATED METHODS

BACKGROUND OF THE INVENTION

The present invention relates to hose clamps having a slotted band for engaging a worm gear, and more particularly to methods and apparatus for engaging the slotted band of a hose clamp and cinching the clamp around a hose prior to tightening the clamp around the hose using the worm gear.

Pipe and hose clamps may involve the passage of a slotted band into a gap of a worm gear. The hose clamp is engaged around a hose by wrapping the open clamp loosely around the hose, and then inserting an end of the slotted band into the worm gear until a slot on the band meets one of the gears. A screw on the worm gear must then be turned in order to rotate the gear which causes the band to be engaged and drawn in. By continuing to turn the screw, the slotted band is pulled further and further into the worm gear causing the hose clamp to be tightened around the hose. The hose clamp may be loosened or removed by turning the screw in the opposite direction which pushes the slotted band out.

In existing hose clamps, the slotted band must be inserted into the worm gear from one direction, while a screwdriver must be engaged with the screw on the worm gear extending out in the opposite direction. In many cases, the hose clamp must also be held in place while the worm gear is slowly tightened so that the clamp is properly positioned on the hose. It is often difficult to engage a hose band around a hose in a cramped or tight location because there may not be enough space to manipulate the slotted band into position while at the same time holding the clamp in place on the hose and also turning the worm gear screw to tighten the clamp. It is therefore desirable to provide methods and apparatus for readily engaging hose clamps around hoses in tight or cramped locations. Embodiments of the present invention provide methods and apparatus which address this problem.

SUMMARY OF THE INVENTION

Embodiments of the present invention provide methods and apparatus that allow hand forces to advance and cinch up the slotted band of a hose clamp to a position where a screwdriver or wrench may be used to continue tightening the worm gear screw of the hose clamp to tighten the clamp to a desired degree.

Embodiments of the invention include a pawl assembly having at least one centrally located downwardly facing tooth provided between a pair of oppositely positioned side walls which act as guides for receiving a slotted band of a hose clamp. In embodiments of the invention, the pawl tooth may be movably mounted such that it is urged (downward) towards the slots on the hose clamp band as it is inserted into the pawl in order to engage the slots. The pawl tooth acts as a ratchet as the slotted band is inserted, engaging the closest slot on the band, and preventing the band from being retracted. The pawl tooth may be mounted such that it may be pulled back in order to disengage the slots and release the band. It is to be appreciated that in different embodiments of the invention, more than one tooth may be provided in the pawl assembly in order to engage more than one slot at the same time, to provide a more secure attachment. Pulling back the mount disengages all teeth of the pawl.

Embodiments of the pawl clamp of the present invention may be stamped from a single metal or plastic piece, casted or molded, and formed to have a size and shape that conforms to the contours of a hose clamp. For example and without limitation, the bottom edges of the oppositely positioned side walls (guide walls) may have the same arc as the hose clamp to which the pawl is to be attached. The stamped piece may be manipulated or bent to form two sides that act as guides, and then folded in order to locate one or more pawl teeth between the side wall guides.

In some aspects of the invention, a worm gear is provided at one of the open ends of a hose clamp, and pawl with guide walls is provided at the other open end of the hose clamp. A separate slotted band is also provided. One end of the slotted band is engaged with the worm gear before the hose clamp is fitted around the hose, leaving the opposite end of the slotted band free. The hose clamp is then loosely draped around the hose or pipe and moved into position. The free end of the slotted band is then inserted by hand into the pawl such that the tooth (or teeth) of the pawl engage(s) one (or more) of the slots on the band. The band may be cinched up by pushing the slotted band as far as possible by hand into the pawl assembly which acts as a ratchet, thereby engaging the hose clamp snugly around the hose. In many cases, this can be easily accomplished with one hand, even in tight or cramped areas, leaving the user's other hand free to hold the clamp in position on the hose during the cinching operation. Once the band has been inserted as far as desired by hand, the hose clamp may be further tightened by rotating the screw on the worm gear. The hose clamp may be loosened or removed by rotating the screw in the opposite direction. The pawl may be released in order to disengage the hose clamp by pulling it back to disengage the one or more teeth from the slotted band.

It is therefore an object of the present invention to provide methods and apparatus for easily engaging hose clamps around hoses or pipes in tight or cramped locations.

It is also an object of the present invention to provide a pawl apparatus for attachment to one end of a worm gear hose clamp in which the pawl has at least one movable downwardly extending tooth between two guide walls for engaging slots of a slotted hose clamp band when inserted into the pawl.

It is also an object of the present invention to provide a hose clamp apparatus having a pawl attached at one open end and a worm gear attached at the other open end in which the pawl has at least one movable downwardly extending tooth between two guide walls for engaging slots of a slotted hose clamp band when inserted into the pawl.

It is also an object of the present invention to provide methods for engaging hose clamps around hoses or pipes in tight or cramped locations by providing a hose clamp having a pawl attached at one open end and a worm gear attached at the other open end in which the pawl has at least one movable downwardly extending tooth between two guide walls for engaging slots of a slotted hose clamp band when inserted into the pawl.

It is also an object of the present invention to provide methods for engaging hose clamps around hoses or pipes in tight or cramped locations by providing a pawl apparatus for attachment to one end of a worm gear hose clamp in which the pawl has at least one movable downwardly extending tooth between two guide walls for engaging slots of a slotted hose clamp band when inserted into the pawl.

Additional objects of the invention will be apparent from the detailed descriptions and the claims herein.

DETAILED DESCRIPTION

Figure 1:
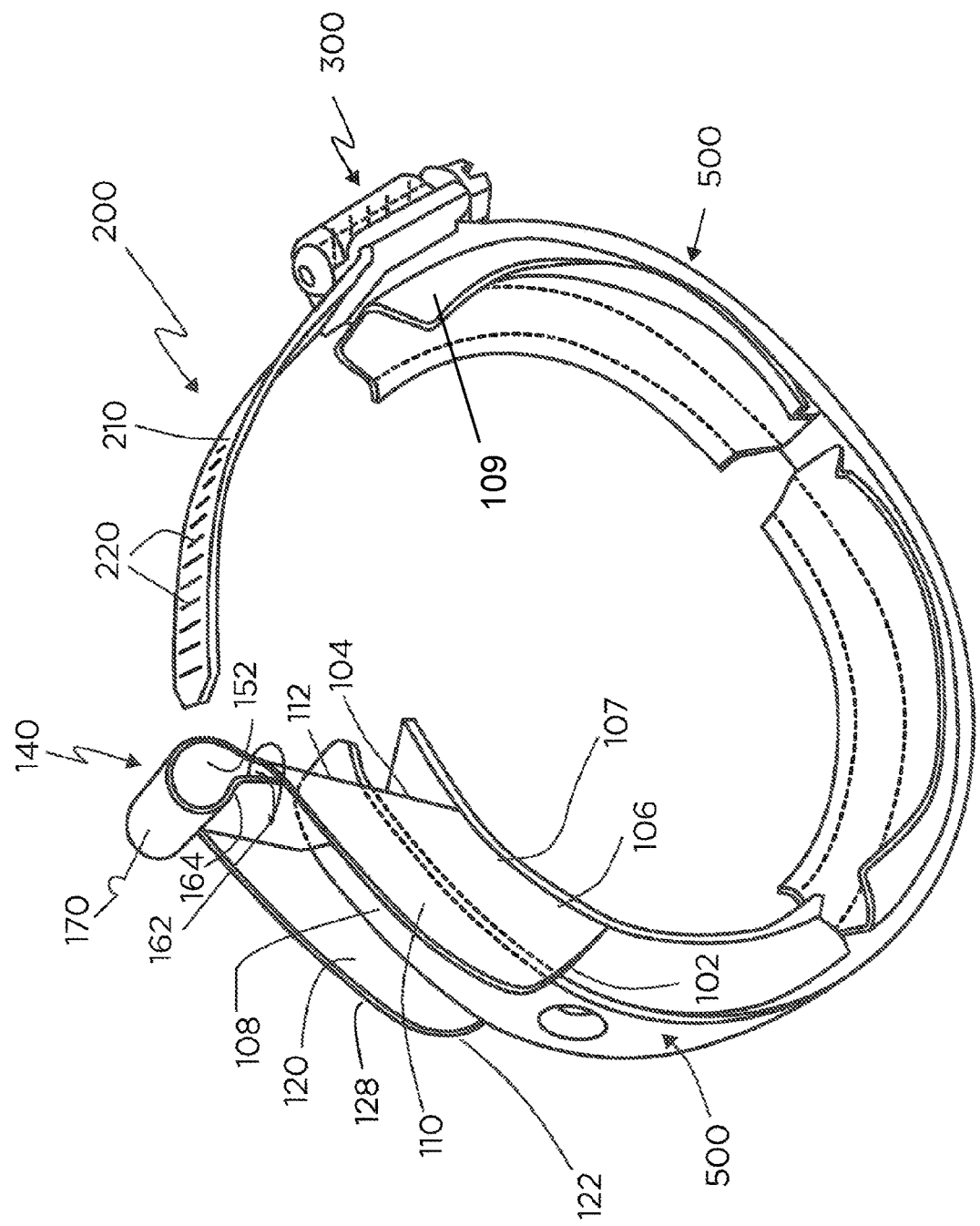
FIG. 1 is a right side perspective view of an embodiment of the invention.
Figure 2:
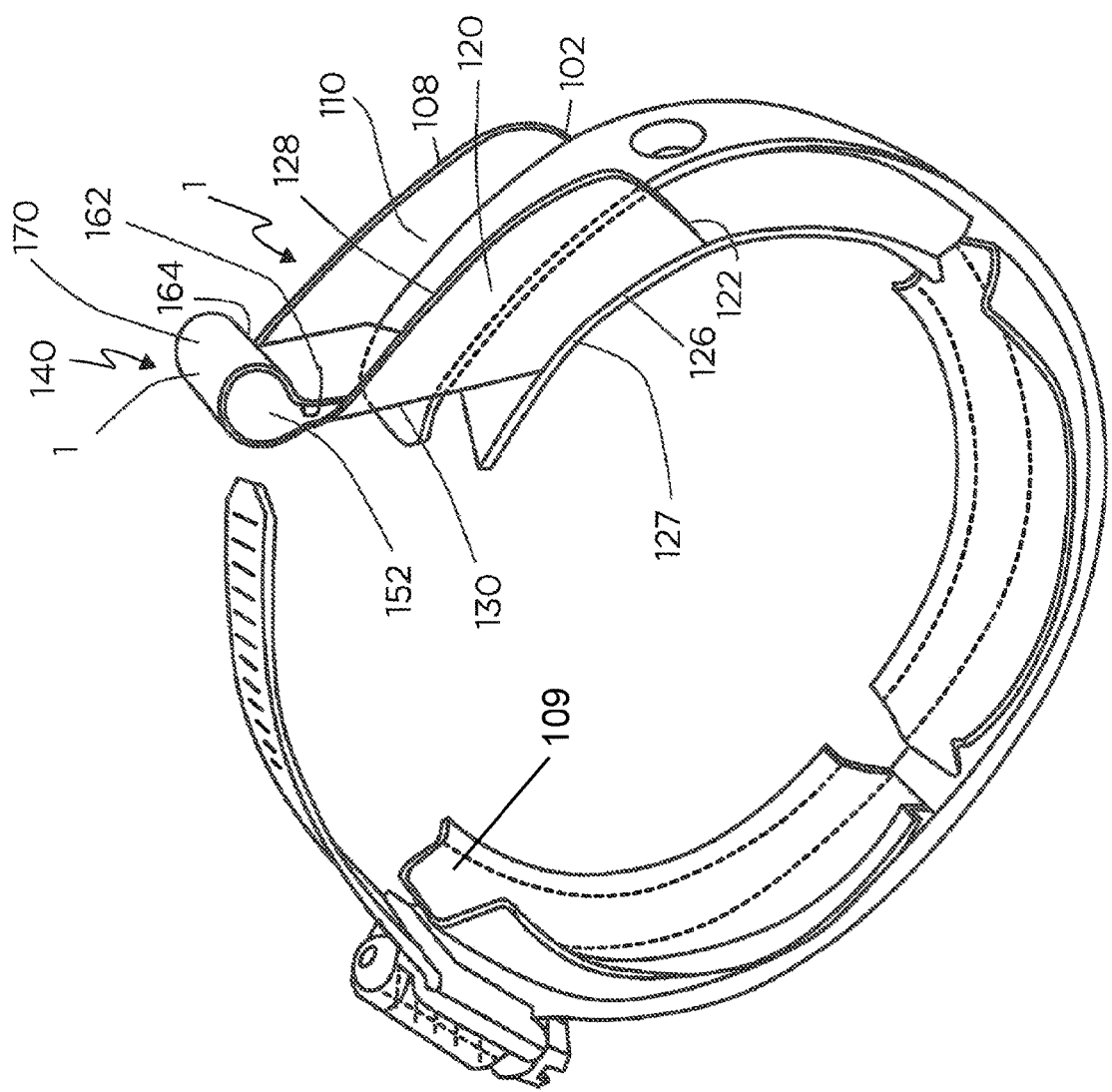
FIG. 2 is a left side perspective view of an embodiment of the invention.

Referring to the drawings wherein like reference characters designate like or corresponding parts throughout the several views, and referring particularly to the exemplary embodiment of FIGS. 1 and 2, it is seen that in these illustrated embodiments, a hose clamp 500 is provided having a worm gear 300 mounted at one open end thereof, and a pawl assembly 140 mounted at the other open end.

The hose clamp 500 may have a smooth interior surface for attachment to a smooth surface of a pipe or hose; or, as shown in FIGS. 1 and 2, hose clamp 500 may have one or more interior cup flanges 109 that are designed to fit over outwardly extending flanges on the hose or pipe.

The pawl assembly comprises a pair of oppositely positioned guide walls 110 and 120 attached to a curled flexible central support structure 170 which may act as a pivot. A pawl flange 162 having a tooth 160 at one end extends out (down) from the support structure 170. Flange 162 may have side edges 114 and 132. The guide walls 110, 120 may be provided with bottom edges 106, 126 which may be curved 107, 127 to match and conform to the arc of the hose clamp 500 to which they are attached. The first guide wall 110 may have a front end 102, a top edge 108, and a rear edge 112. The second guide wall 120 may also have a front end 122, a top edge 128, and a rear edge 130.

In embodiments of the invention, a band 200 having slots 220 thereon may be provided. One end of band 200 is engaged with the worm gear 300 by inserting the band and turning the worm gear screw until engaged. After loosely wrapping the hose clamp 500 around a hose, the other end of band 200 is inserted into a gap 180 of the pawl mechanism 140 such that downwardly extending tooth 160 may engage one of the slots 220 of band 200, one at a time, in a ratcheting manner as band 200 is pushed into pawl 140. The hose clamp may then be tightened by rotating a screw on the worm gear 300. Band 200 may be released by pivoting support structure 170 upward to raise tooth 160 from engagement with slots 220. The hose clamp 500 may be loosened by rotating the screw in the opposite direction.

Because the slotted band 200 is separate from both the worm gear 300 and the pawl assembly 140, it may be easily moved, removed or replaced in the event that band 200 becomes damaged or stripped. For example and without limitation, if some of the slots 220 of a band 200 become stripped, the worm gear screw may be turned (e.g., loosened) so that it engages a different set of slots, and band 200 may be further inserted (ratcheted) into pawl assembly 140 to engage a different slot on the band. The worm gear screw may then be rotated to tighten up the hose clamp 500. Alternatively, a damaged slotted band 200 may be released from the pawl assembly and unscrewed from the worm gear and discarded, and then replaced by a different slotted band 200 which is first attached to the worm gear 300, then inserted into the pawl assembly 140 and ratcheted to cinch up the clamp, and finally tightened using the worm gear screw. These examples show how to avoid replacing an otherwise usable hose clamp.

In some embodiments, an integrated hose clamp assembly may be provided where worm gear 300 is provided at one end of the hose clamp, and pawl assembly 140 is provided at the other end. In these embodiments, both the worm gear 300 and the pawl assembly 140 may be molded, manufactured and/or integrated into a single structure. A separate slotted band 200 is provided in these embodiments allowing for one end of band 200 to be inserted into the worm gear 300, and the other end to be inserted into the pawl assembly 140.

In other embodiments, a pawl assembly 140 may be welded or otherwise firmly attached to an existing hose clamp 500 that already has a worm gear 300 at one end. These embodiments allow existing hose clamps to be retrofitted with the pawl assembly, avoiding the need to manufacture an entirely new hose clamp.

Figure 3:
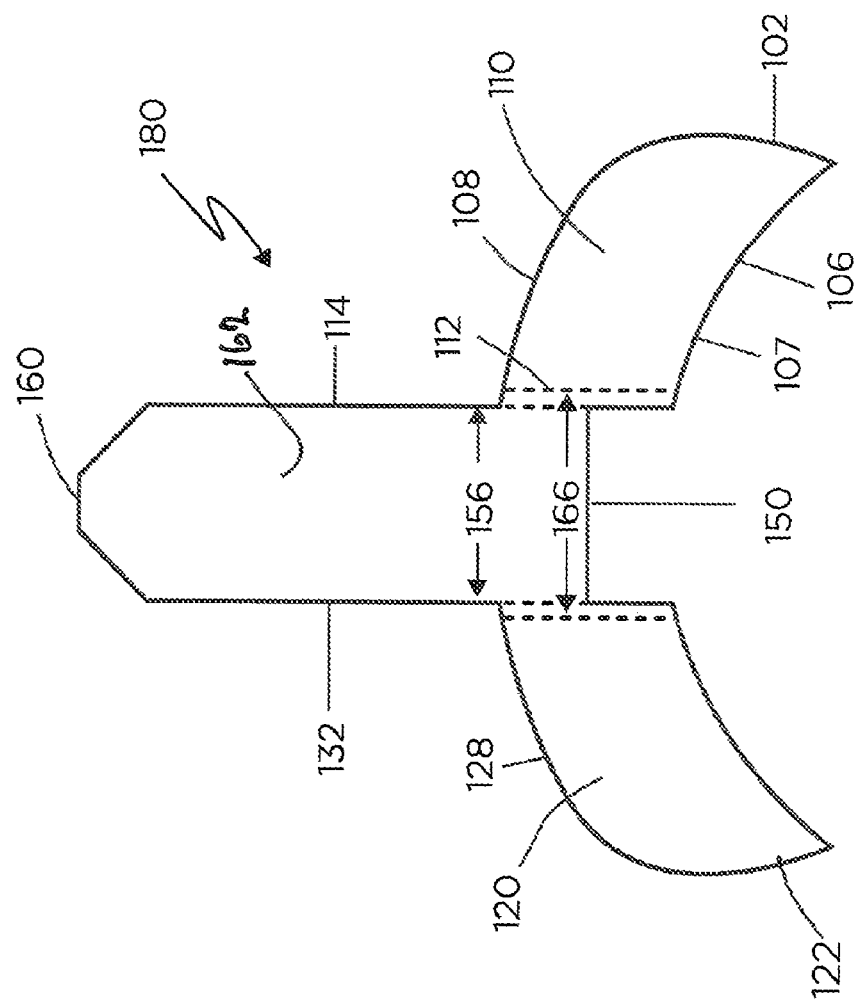
FIG. 3 is a top plan view of a pre-cut blank for use in forming an embodiment of the invention.
Figure 4:
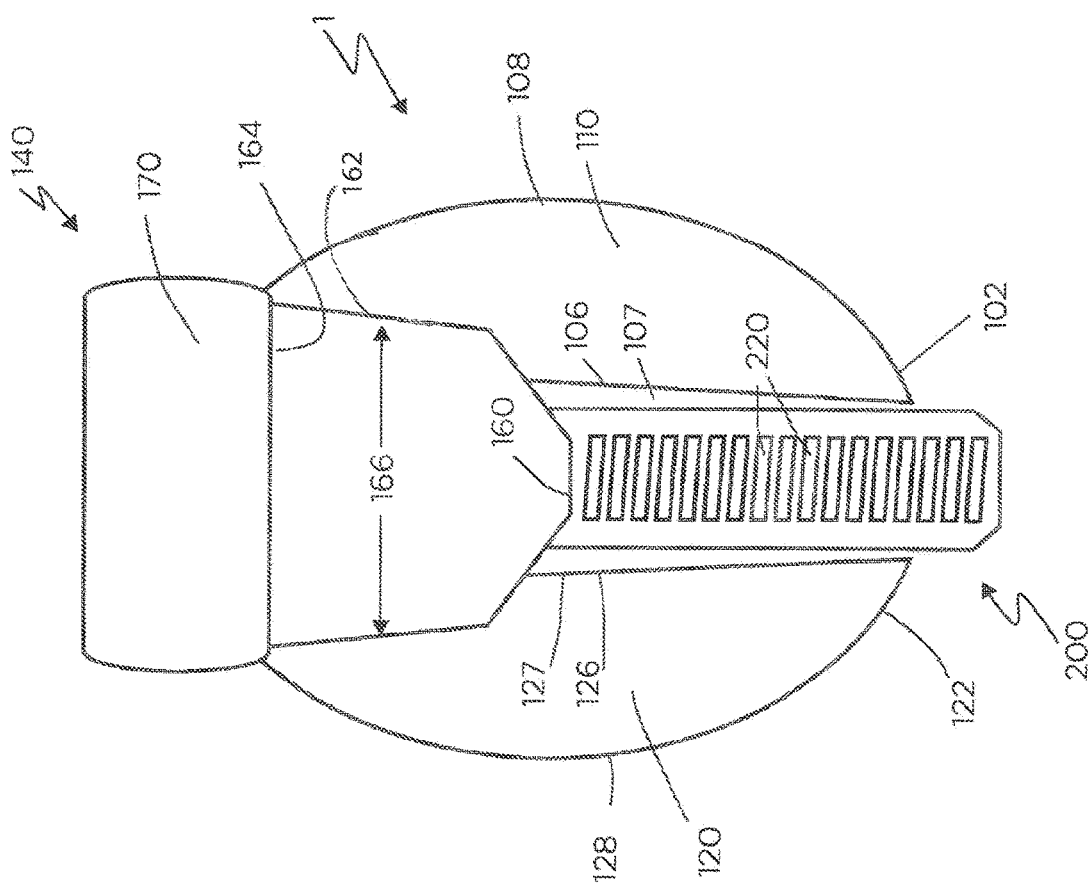
FIG. 4 is a top view of an embodiment of a pawl of the present invention showing the insertion of a slotted band.
Figure 5:
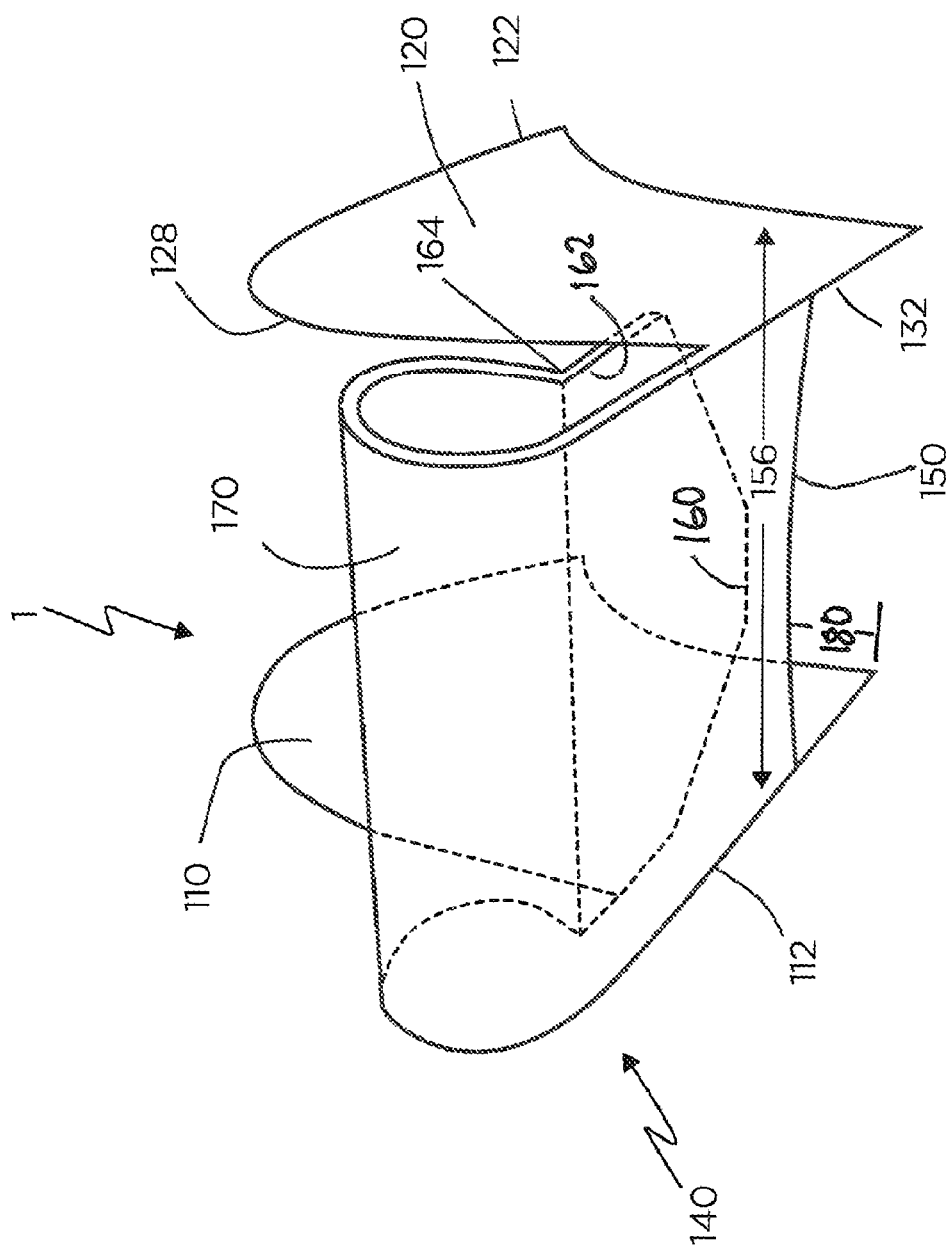
FIG. 5 is a top rear perspective view of an embodiment of the invention.
Figure 6:
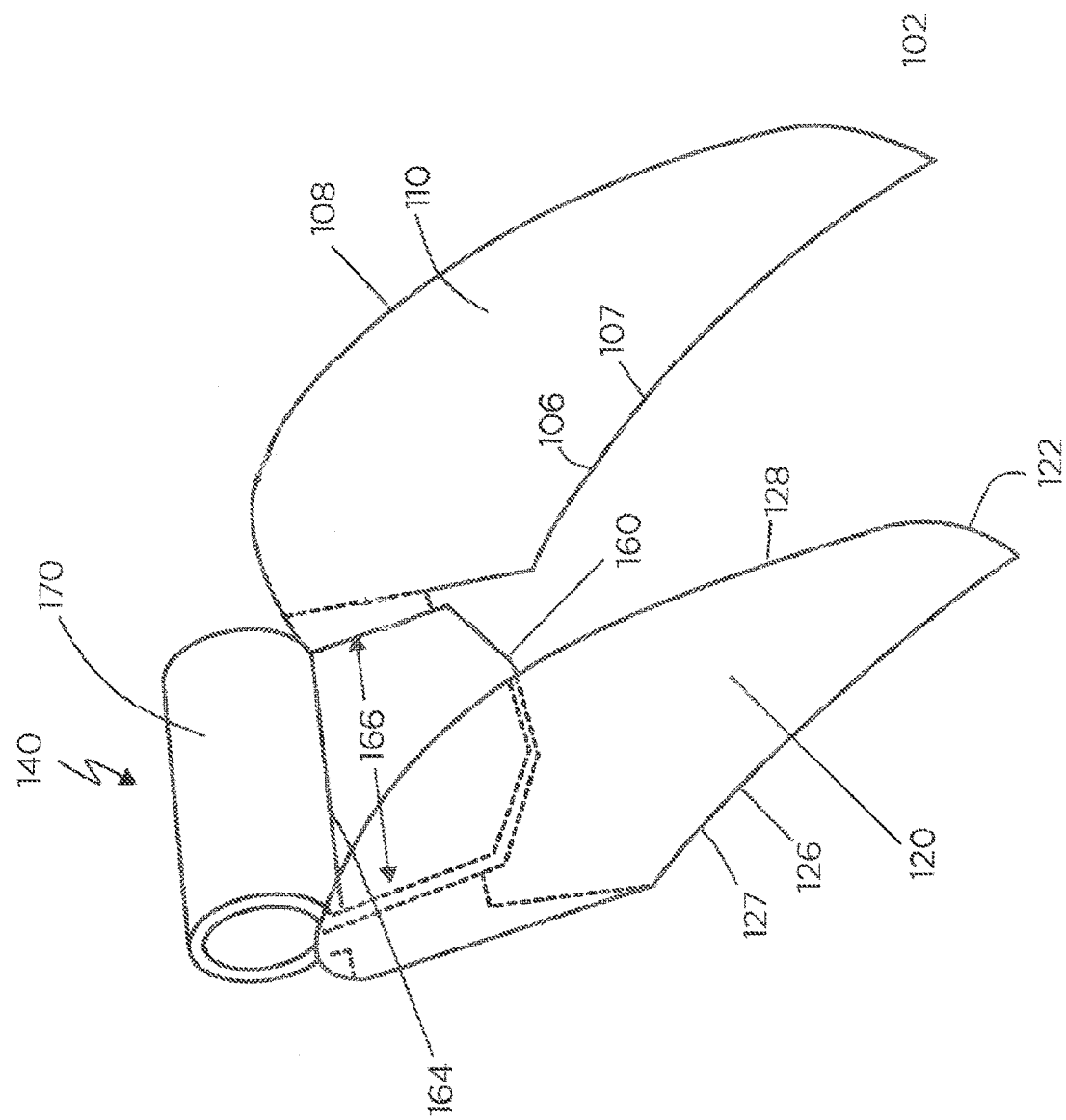
FIG. 6 is a top front perspective view of an embodiment of the invention.
Figure 7:
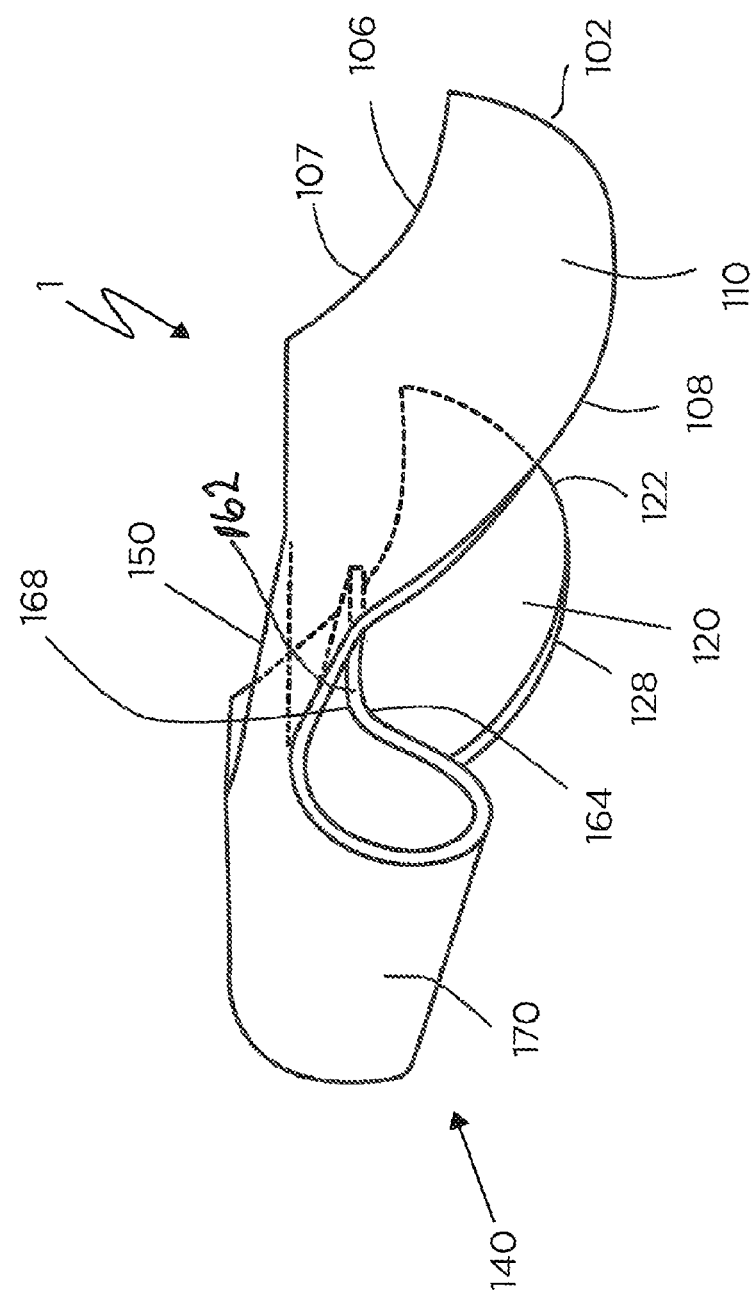
FIG. 7 is a bottom side perspective view of an embodiment of the invention.

Referring to FIG. 3, it is seen that in some embodiments, a pawl assembly may be formed from a stamped blank 180. The blank 180 may be made of steel in order that it may be bent and formed into a pawl assembly and thereafter welded onto an existing hose clamp. To form a pawl assembly from a blank such as 180 illustrated in FIG. 3, the two side flanges 110 and 120 may be folded up from the horizontal position shown to an upright or vertical position, along lines 112. An example of the resulting structure is shown in FIGS. 5-7. Flange 162 may be folded between upright flanges 110 and 112 in a curled shape 170, with tooth 160 extending out in a downward direction from a fold 164, as shown, for example, in FIG. 6. The bottom edges 106 and 126 may be curved at 107 and 127 to conform to the arc of a hose clamp 500 to which they may be attached via welding or other suitable methods, as shown in the examples shown in FIGS. 1 and 2. It is to be appreciated that in other embodiments, pawl assemblies of the present invention may be casted or molded.

It is to be understood that variations and modifications of the present invention may be made without departing from the scope thereof. In particular, and without limitation, each of the various features and/or aspects of each embodiment disclosed herein may be used with other features and/or aspects of other embodiment disclosed herein in different combinations. Other combinations of features of the various embodiments disclosed herein are also included within the scope of the invention. It is also to be understood that the present invention is not to be limited by the specific embodiments disclosed herein, but only in accordance with the appended claims when read in light of the foregoing specification.

What is claimed is:

1. A hose clamp assembly comprising
a. a discontinuous circular structural member for encircling a portion of a hose, the circular member having a first end and a second end;
b. a worm gear provided at the first end of said circular structural member;
c. a pawl assembly provided at the second end of said circular structural member, wherein said pawl assembly comprises a pair of guide flanges positioned on opposite sides of said circular member and a central flange provided between said guides having at least one tooth member thereon that is movably urged toward an interior of said circular member; and d. a slotted band having a first end for engagement with said worm gear and an opposite end for engagement with said pawl assembly.

2. The assembly of claim 1 wherein said central flange further comprises a curled flexible central support structure.

3. The assembly of claim 2 wherein said central flange acts as a pivot for said at least one tooth.

4. The assembly of claim 1 wherein at least one cup flange is provided on an interior surface of said discontinuous circular member.

* * * * *